United States Patent
Shimano et al.

(10) Patent No.: US 9,570,962 B2
(45) Date of Patent: Feb. 14, 2017

(54) CONTROLLER-INTEGRATED ROTATING ELECTRICAL MACHINE

(71) Applicant: MITSUBISHI ELECTRIC CORPORATION, Chiyoda-ku, Tokyo (JP)

(72) Inventors: Tomoaki Shimano, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 610 days.

(21) Appl. No.: 14/086,030

(22) Filed: Nov. 21, 2013

(65) Prior Publication Data

US 2015/0054363 A1 Feb. 26, 2015

(30) Foreign Application Priority Data

Aug. 26, 2013 (JP) .................................. 2013-174108

(51) Int. Cl.
*H02K 9/28* (2006.01)
*H02K 11/00* (2016.01)
(Continued)

(52) U.S. Cl.
CPC ............. *H02K 11/048* (2013.01); *H01R 39/38* (2013.01); *H02K 9/28* (2013.01)

(58) Field of Classification Search
CPC . H02K 9/06; H02K 9/28; H02K 11/00–11/40; H01R 39/38–39/415
(Continued)

(56) References Cited

U.S. PATENT DOCUMENTS 5,917,157 A * 6/1999 Remsburg ............ H05K 1/0206
174/252
7,352,091 B2 * 4/2008 Bradfield ............. H02K 5/1732
310/64
(Continued)

FOREIGN PATENT DOCUMENTS

JP 2006-33986 A 2/2006
JP 2006211835 A 8/2006
(Continued)

OTHER PUBLICATIONS

Communication dated Nov. 25, 2014, issued by the Japan Patent Office in corresponding Japanese Application No. 2013-174108.
(Continued)

*Primary Examiner* — Thomas Truong
(74) *Attorney, Agent, or Firm* — Sughrue Mion, PLLC; Richard C. Turner (57) ABSTRACT

An inverter device is provided with a hollow portion in a center portion of a rotation shaft of a rotating electrical machine. The rotating electrical machine has a first cooling air passage for cooling air generated by a cooling fan to flow in from an outer side in a radial direction of the rotating electrical machine, then to cool a heat sink, and to be discharged through ventilation holes provided to a rear bracket on an outer peripheral side by passing an inner periphery of the rear bracket, and a second cooling air passage for cooling air to flow into the hollow portion from the rear in the axial direction, then to cool a brush holder and a magnetic pole position detection sensor, and to be discharged through the ventilation holes by passing the inner periphery of the rear bracket.

12 Claims, 10 Drawing Sheets

(51) Int. Cl.
*H01R 39/38* (2006.01)
*H02K 11/04* (2016.01)

(58) Field of Classification Search
USPC ........ 310/71, 58, 59, 62, 63, 238–253, 68 B
See application file for complete search history.

(56) References Cited

U.S. PATENT DOCUMENTS

| | | | |
|---|---|---|---|
| 7,417,353 B2* | 8/2008 | Wada | H02K 9/28 |
| | | | 310/239 |
| 7,476,996 B2* | 1/2009 | Makiuchi | H02K 3/522 |
| | | | 310/71 |
| 7,638,910 B2 | 12/2009 | Akita et al. | |
| 2007/0103101 A1 | 5/2007 | Kikuchi et al. | |
| 2009/0001829 A1* | 1/2009 | Uchimura | H02K 5/148 |
| | | | 310/83 |
| 2009/0127945 A1* | 5/2009 | Hino | H02K 11/048 |
| | | | 310/63 |
| 2009/0243407 A1* | 10/2009 | Kato | H02K 11/048 |
| | | | 310/62 |
| 2014/0125168 A1* | 5/2014 | Fukase | H02K 9/28 |
| | | | 310/64 |

FOREIGN PATENT DOCUMENTS

| | | | | |
|---|---|---|---|---|
| JP | 2012211835 A | 11/2012 | | |
| JP | 2012249418 A | 12/2012 | | |
| JP | WO 2013069105 A1 * | 5/2013 | ............... | H02K 9/28 |

OTHER PUBLICATIONS

Communication dated Jan. 6, 2015, issued by the Japan Patent Office in corresponding Japanese Application No. 2013-174108.

* cited by examiner

CONTROLLER-INTEGRATED ROTATING ELECTRICAL MACHINE

BACKGROUND OF THE INVENTION

Field of the Invention

The present invention relates to a controller-integrated rotating electrical machine, and more particularly, to a controller-integrated rotating electrical machine suitably mounted on a vehicle.

Description of the Related Art

As an existing device representing a controller-integrated rotating electrical machine, for example, JP-A-2006-33986 (Patent Document 1) discloses a configuration in which an inverter device equipped with switching elements and a control circuit is mounted on an outer side of a bracket on the opposite side to a load (hereinafter, referred to as the rear bracket) of a rotating electrical machine main body in a direction of a rotation shaft. The controller-integrated rotating electrical machine disclosed in Patent Document 1 is configured in such a manner that a heat sink of the inverter device is cooled by cooling air that flows in from the outer side in a radial direction of the inverter device and is discharged from exhaust holes provided to the rear bracket on the outer side in the radial direction by passing through ventilation holes provided along an outer periphery of a bearing holding portion of the rear bracket.
[Patent Document 1] JP-A-2006-33986

In the controller-integrated rotating electrical machine in the related art described above, cooling air is generated by a fan attached to a rotor. The cooling air flows in from the outer side in the radial direction of the inverter device and is discharged from the exhaust holes provided to the rear bracket on the outer side in the radial direction by passing through the ventilation holes provided along the outer periphery of the bearing holding portion of the rear bracket. Owing to this configuration, the heat sink of the inverter device is cooled. However, a passage of the cooling air is a passage for the cooling air to flow in from the outer side in the radial direction and to be discharged to the outer peripheral side in the radial direction. Hence, there is a problem that a brush holder and a magnetic pole position detection sensor installed in the vicinity of the center of the rotation shaft cannot be cooled satisfactorily.

SUMMARY OF THE INVENTION

The invention was devised to solve the problem discussed above and has an object to provide a controller-integrated rotating electrical machine capable of effectively cooling an inner peripheral side surface of an inverter device, a brush holder, and a magnetic pole position detection sensor, and hence capable of lowering temperatures of the inverter device, the brush holder, and the magnetic pole position detection sensor.

A controller-integrated rotating electrical machine according to an aspect of the invention includes a stator and a rotor supported on a front bracket and a rear bracket. The rotor has a field winding generating a magneto-motive force and a cooling fan and is supported in a rotatable manner on a rotation shaft supported on a front bearing provided to the front bracket and a rear bearing provided to the rear bracket. A magnetic pole position detection sensor detecting a magnetic pole position of the rotating electrical machine and a brush holder having brushes that pass a current to the field winding are installed at a rear of the rear bearing in an axial direction of the rotation shaft. An inverter device controlling and passing a stator current to an armature winding of the rotating electrical machine is mounted on an outer side of the rear bracket at the rear in the axial direction of the rotation shaft. The inverter device includes switching elements passing the stator current, a heat sink cooling the switching elements, and a control board on which is mounted a control circuit that controls operations of the switching elements and the rotating electrical machine. The inverter device is provided with a hollow portion in a center portion of the rotation shaft of the rotating electrical machine. The rotating electrical machine has a first cooling air passage for cooling air generated by the cooling fan to flow in from an outer side in a radial direction of the rotating electrical machine, then to cool the heat sink, and to be discharged through ventilation holes provided to the rear bracket on an outer peripheral side bypassing an inner periphery of the rear bracket, and a second cooling air passage for cooling air to flow into the hollow portion from the rear in the axial direction, then to cool the brush holder and the magnetic pole position detection sensor, and to be discharged through the ventilation holes by passing the inner periphery of the rear bracket. The brushes and the magnetic pole position detection sensor are installed in such a manner that a sliding direction of the brushes and a direction in which terminals of the magnetic pole position detection sensor extend are aligned in substantially a same direction.

The controller-integrated rotating electrical machine of the invention configured as above can lower a temperature of the switching elements by cooling the heat sink of the inverter device by first cooling air from the outer side in the radial direction of the rotating electrical machine. Also, by installing the brushes and the magnetic pole position detection sensor in the hollow portion of the inverter device in such a manner that the sliding direction of the former and the direction in which the terminals of the latter extend are aligned in substantially the same direction, an air volume of second cooling air that flows in from the rear in the axial direction is increased. It thus becomes possible to effectively cool the inner peripheral side surface of the inverter device, the brush holder, and the magnetic pole position detection sensor. Hence, temperatures of the inverter device, the brush holder, and the magnetic pole position detection sensor can be lowered.

The foregoing and other objects, features, aspects, and advantages of the present invention will become more apparent from the following detailed description of the present invention when taken conjunction with the accompanying drawings.

DETAILED DESCRIPTION OF THE PREFERRED EMBODIMENTS

Hereinafter, preferred embodiments of a controller-integrated rotating electrical machine of the invention will be described using the drawings. Descriptions will be given by labeling same or equivalent portions with same reference numerals.

First Embodiment

FIG. 1 through FIG. 4 show a configuration of a controller-integrated rotating electrical machine 100A of a first embodiment. FIG. 5 is a schematic circuit diagram thereof.

Referring to FIG. 1 through FIG. 5, the controller-integrated rotating electrical machine (hereinafter, referred to also simply as the rotating electrical machine) 100A includes a housing formed of a front bracket 1 and a rear bracket 2, a stator 3 having stator windings 3a, and a rotor 6 having a rotation shaft 4 and a field winding 5. The stator 3 is fixedly supported on one end of the front bracket 1 and one end of the rear bracket 2. The rotor 6 is installed on the inner side of the stator 3. The rotation shaft 4 of the rotor 6 is supported in a rotatable manner on a front bearing 7a and a rear bearing 7b both provided to the housing. The rotor 6 is allowed to rotate coaxially with respect to the stator 3.

Figure 1:
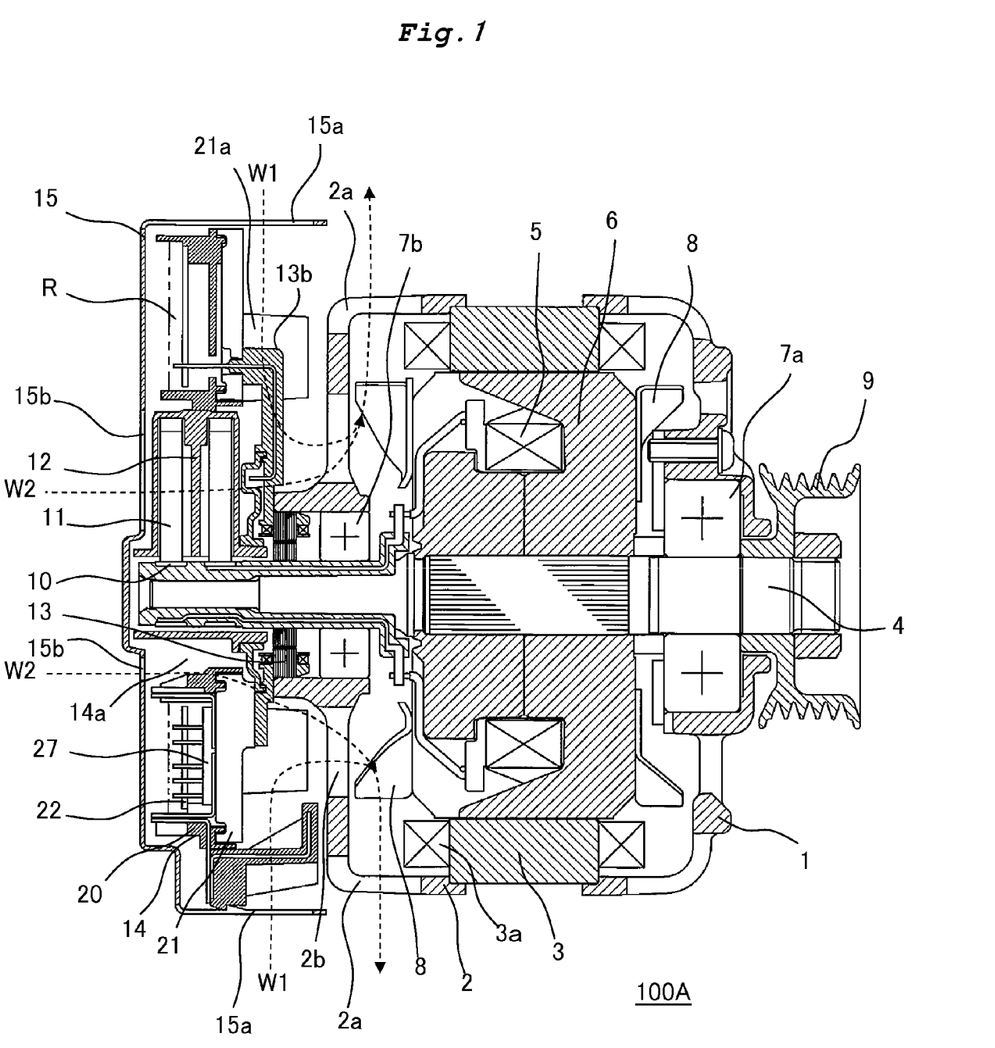
FIG. 1 is a cross section of a controller-integrated rotating electrical machine according to a first embodiment of the invention.

Cooling fans 8 are fixed to both end faces of the rotor 6 in an axial direction. Also, a pulley 9 is attached to an end of the rotation shaft 4 on an outer side of the front bracket 1. A pair of slip rings 10 is attached on the rear side of the rotation shaft 4. A pair of brushes 11 coming into sliding contact with the slip rings 10 is installed inside a brush holder 12. The slip rings 10, the brushes 11, and the brush holder 12 are components to supply DC power to the field winding 5. It should be noted that a high heat-releasing material having heat conductivity of 20 W/(m·K) or higher is used as a resin material of the brush holder 12 and a temperature of the brush holder 12 can be effectively lowered by cooling air that flows in from a hollow portion of an inverter device described below.

The rotating electrical machine 100A includes a magnetic pole position detection sensor 13, an inverter device 14, and an outside cover 15 that encloses the inverter device 14 therein. The brush holder 12, the magnetic pole position detection sensor 13, and the inverter device 14 are installed on an outer side at a rear of the rear bracket 2. The magnetic pole position detection sensor 13 is installed between the rear bearing 7b and the brush holder 12 and attached to a rear end of the rear bracket 2. In this embodiment, a winding sensor is used as the magnetic pole position detection sensor 13. Hence, the magnetic pole position detection sensor 13 functions as a sensor when a current is passed through the winding. Also, a major diameter of the magnetic pole position detection sensor 13 is larger than a major diameter of the slip rings 10.

Figure 6:
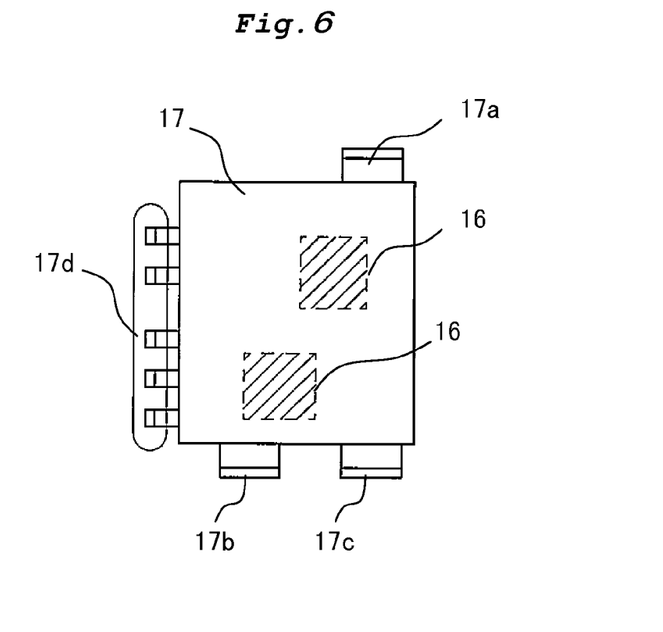
FIG. 6 is a view showing a power module of an inverter device mounted on the controller-integrated rotating electrical machine according to the first embodiment of the invention.
Figure 7:
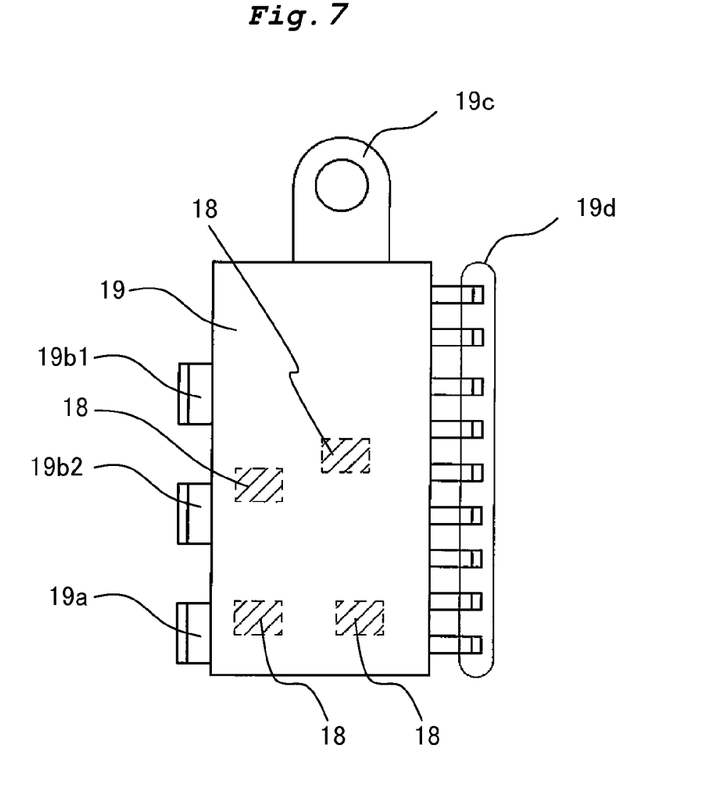
FIG. 7 is a view showing a field module of the inverter device mounted on the controller-integrated rotating electrical machine according to the first embodiment of the invention.

The inverter device 14 is formed of power modules 17 each including therein power circuit semiconductor switching elements 16 to supply a current to the stator windings 3a as is shown in FIG. 6, a field module 19 including therein field circuit semiconductor switching elements 18 to control power to be supplied to the field winding 5 as is shown in FIG. 7, a resin case 20, a heat sink 21 to cool the power modules 17 and the field module 19, and a control board 22 on which is mounted a control circuit that controls operations of the power circuit semiconductor switching elements 16, the field circuit semiconductor switching elements 18, and the rotating electrical machine 100A. The heat sink 21 is fixed to and held by the rear bracket 2 with bolts 23 (see FIG. 4) and it is configured in such a manner that the heat sink 21 and the rear bracket 2 are at the same potential.

The heat sink 21 has fins 21a extending toward the rear bracket 2. The power modules 17 and the field module 19 are mounted to the heat sink 21 on the opposite side to the fins 21a in the axial direction via an insulating layer (not shown) having good heat conductivity. The control board 22 is mounted to the heat sink 21 on the rear side of the power modules 17 and the field module 19 in the axial direction. The power modules 17, the field module 19, the control board 22, and the heat sink 21 are enclosed in the resin case 20. A space defined by the heat sink 21 and the resin case 20 is filled with waterproof resin R, such as epoxy, silicon, and urethane. The power modules 17, the field module 19, and the control board 22 are therefore resin-encapsulated with the waterproof resin R.

The heat sink 21 is formed in substantially an annular shape hollowed on the periphery of the rotation shaft 4 and the resin case 20 is also formed so that the periphery of the rotation shaft 4 is hollow. The inverter device 14 is formed so that the periphery of the rotation shaft 4 is hollow and the brush holder 12 and the magnetic pole position detection sensor 13 are installed in this hollow portion 14a of the inverter device 14.

First cooling air inlet holes 15a are provided to the outside cover 15 along the outer periphery in the radial direction. Also, exhaust holes 2a are provided to the rear bracket 2 on the outer peripheral side in the radial direction. Also, second cooling air inlet holes 15b are provided to the outside cover 15 at the rear in the axial direction so as to oppose the hollow portion 14a of the inverter device 14. Ventilation holes 2b are provided to the rear bracket 2 along the outer periphery of the bearing holding portion.

In the configuration above, when the rotor 6 of the rotating electrical machine 100A is driven to rotate, the cooling fans 8 are driven. Then, a first cooling air ventilation passage is formed, through which first cooling air W1 flows as are indicated by broken arrows of FIG. 1 and FIG. 2. That is, the first cooling air W1 flows in from the first cooling air inlet holes 15a provided to the outside cover 15 along the outer periphery in the radial direction. The first cooling air W1 then flows into spaces among the fins 21a present between a base surface of the heat sink 21 and a rear end face of the rear bracket 2 and passes through the ventilation holes 2b provided to the rear bracket 2 along the outer periphery of the rear bearing holding portion. Thereafter, the first cooling air W1 is bent in a centrifugal direction and discharged from the exhaust holes 2a provided to the bracket 2 on the outer peripheral side in the radiation direction while cooling the stator windings 3a and the rear bracket 2.

Figure 2:
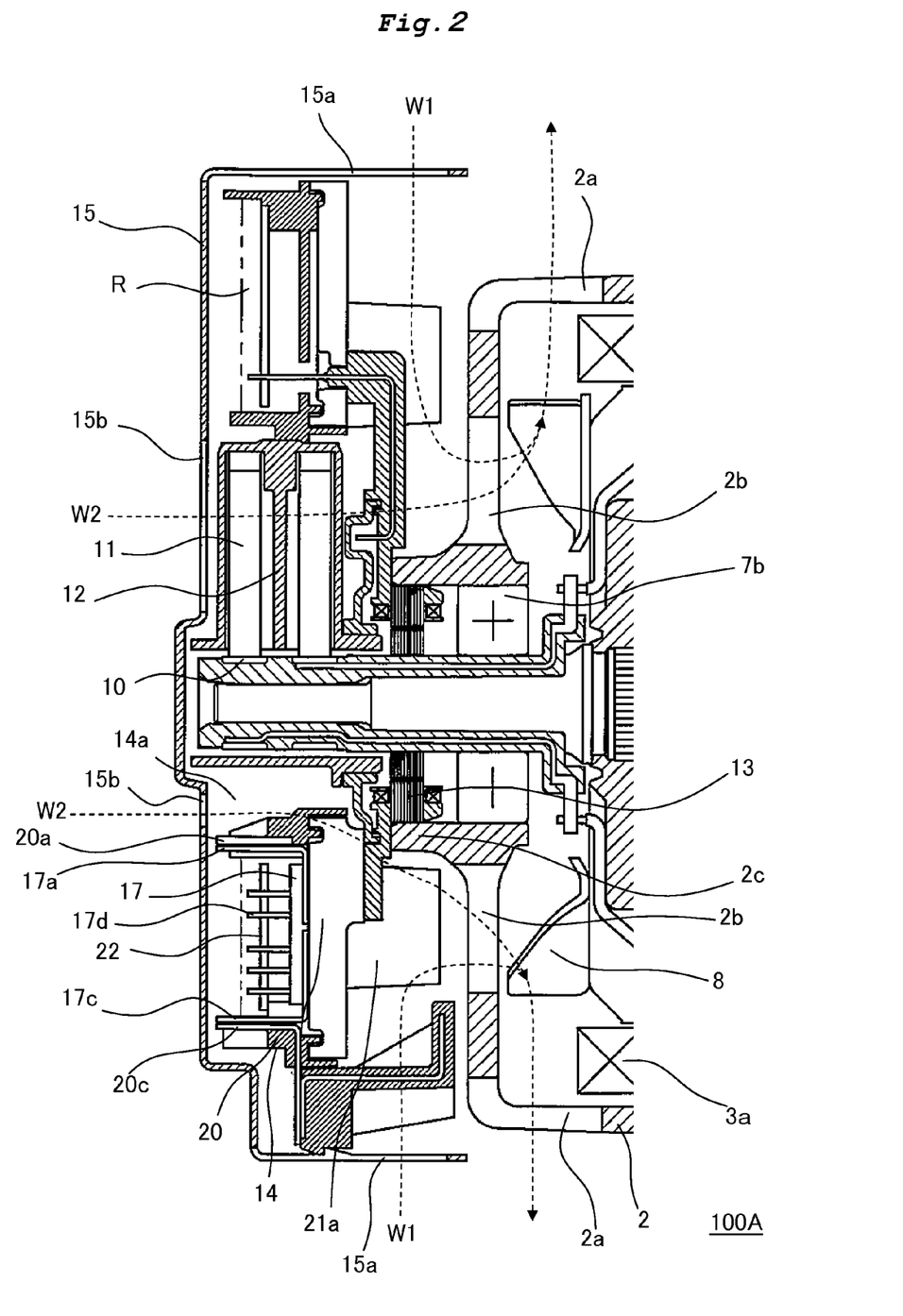
FIG. 2 is a partially enlarged cross section of the controller-integrated rotating electrical machine according to the first embodiment of the invention.
Figure 3:
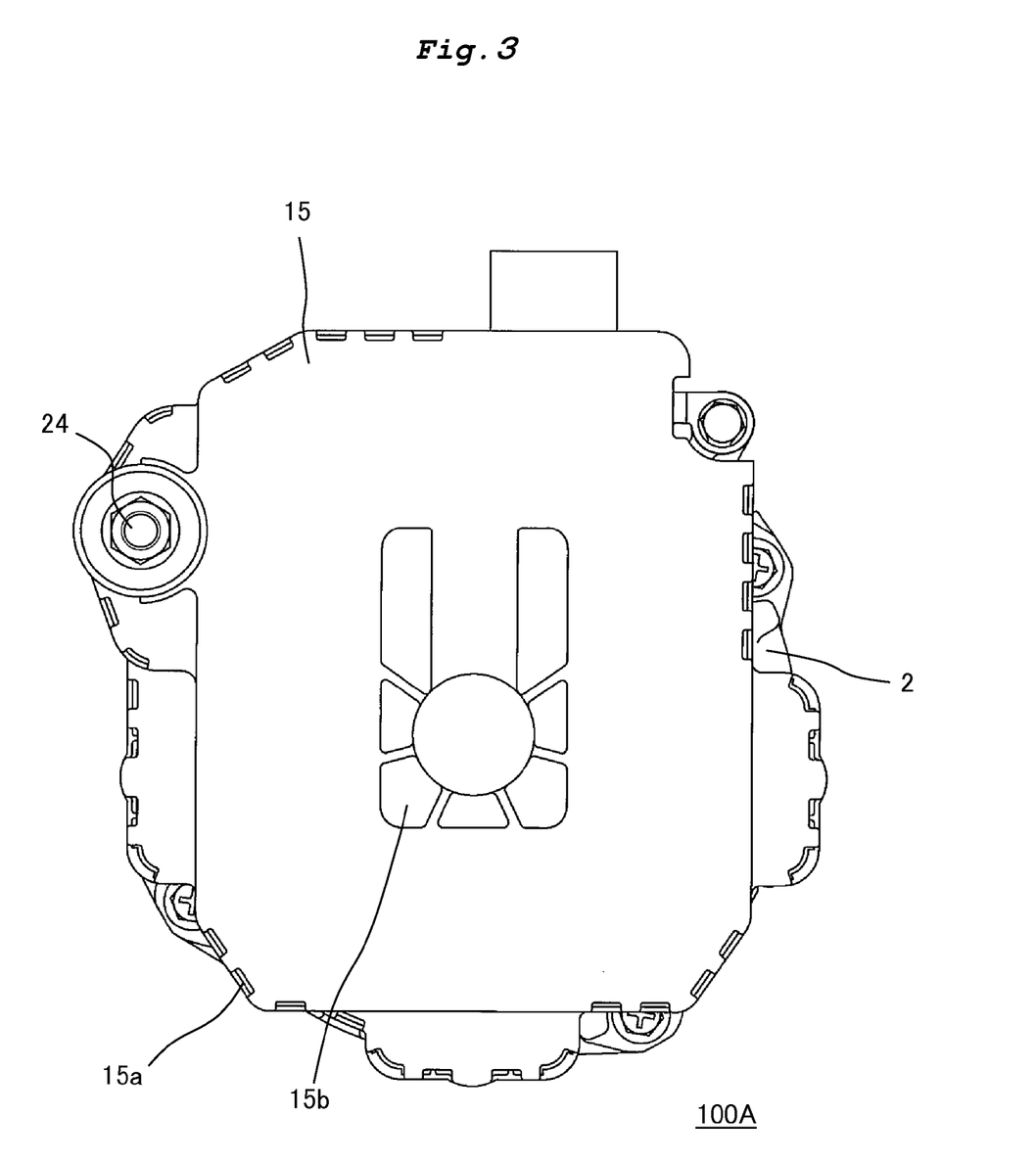
FIG. 3 is a view of the controller-integrated rotating electrical machine according to the first embodiment of the invention when viewed from a rear side.

Also, a second cooling air ventilation passage is formed, through which second cooling air W2 flows as follows. That is, the second cooling air W2 flows in from the second cooling air inlet holes 15b provided to the outside cover 15. The second cooling air W2 then passes by the vicinity of the magnetic pole position detection sensor 13 and an attachment portion 2c of the rear bracket 2 where the magnetic pole position detection sensor 13 is attached by way of the hollow portion 14a of the inverter device 14 and the vicinity of the brush holder 12. Further, the second cooling air W2 passes through the ventilation holes 2b provided to the rear bracket 2 along the outer periphery of the bearing holder portion, after which the second cooling air W2 is bent in the centrifugal direction and discharged from the exhaust holes 2a provided to the rear bracket 2 on the outer peripheral side in the radial direction while cooling the stator windings 3a and the rear bracket 2. In this embodiment, the brushes 11 and the magnetic pole position detection sensor 13 are installed in the hollow portion 14a of the inverter device 14 in such a manner that a sliding contact direction of the former and a direction in which terminals 13b of the latter extend are aligned in substantially a same direction. This configuration prevents blocking of the second cooling air ventilation passage for the second cooling air W2 flowing in from the rear in the axial direction to flow through. Hence, an air volume of the second cooling air W2 increases and it becomes possible to effectively cool the inner peripheral side surface of the inverter device 14, the brush holder 12, and the magnetic pole position detection sensor 13, and hence to lower temperatures of the inverter device 14, the brush holder 12, and the magnetic pole position detection sensor 13.

Figure 4:
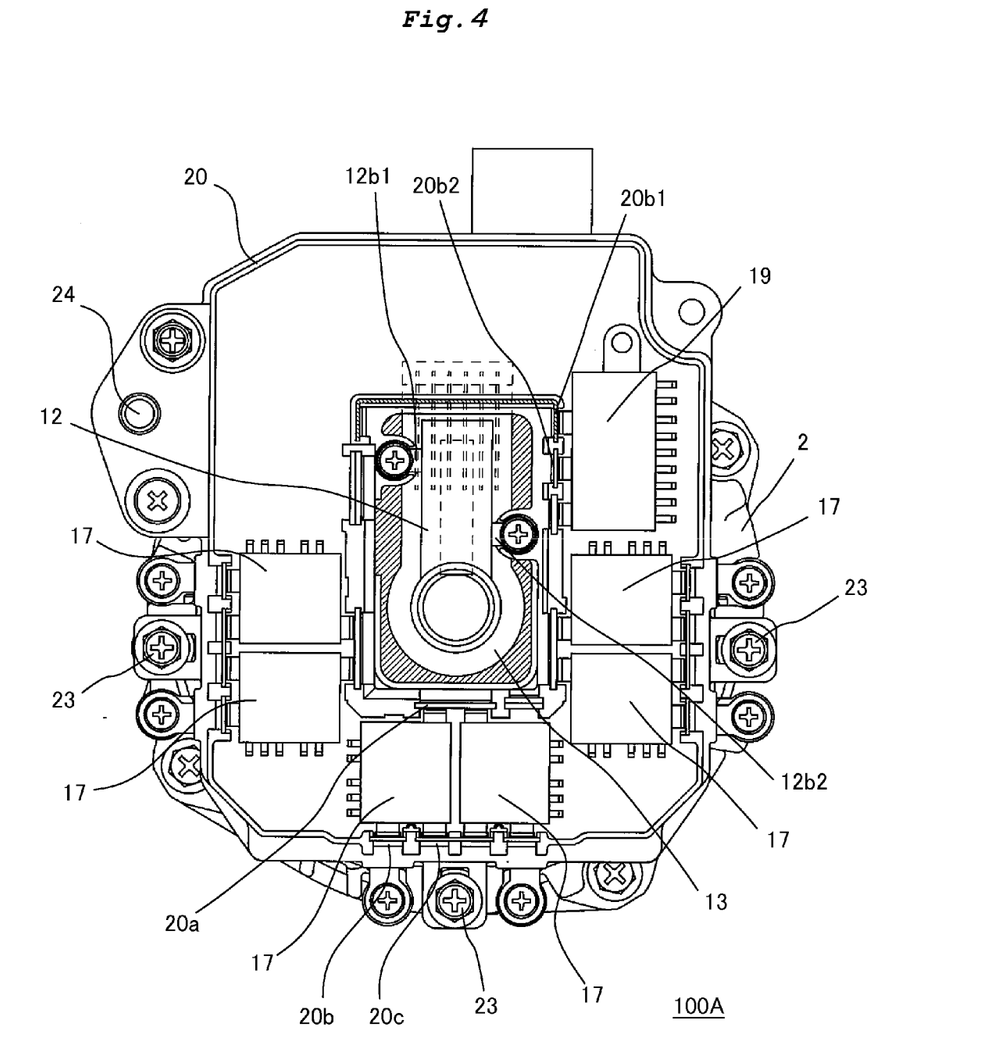
FIG. 4 is a view of the controller-integrated rotating electrical machine according to the first embodiment of the invention when viewed from the rear side by omitting an outside cover, waterproof resin, and a control board.
Figure 5:
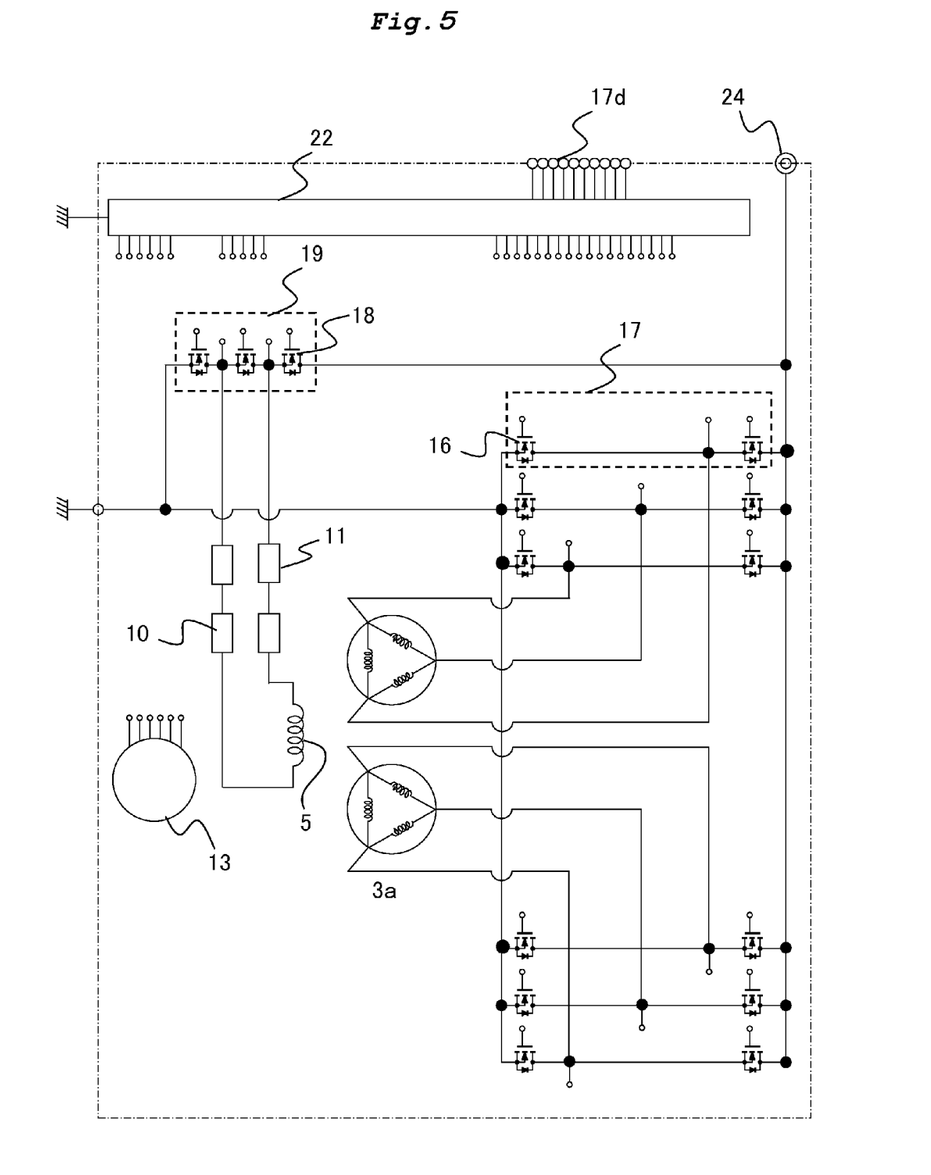
FIG. 5 is a schematic circuit diagram of the controller-integrated rotating electrical machine according to the first embodiment of the invention.

Further, in this embodiment, as is shown in FIG. 4, the field module 19 including therein control elements controlling power to be supplied to the field winding 5, for example, the field circuit semiconductor switching elements 18, is installed at a position at which a longitudinal direction thereof is offset to be substantially parallel to the direction of the brushes 11 and the direction in which the terminals 13b of the magnetic pole position detection sensor 13 extend. Owing to this configuration, not only does it become possible to install the brushes 11 and the magnetic pole position detection sensor 13 in such a manner that the direction of the former and the direction in which the terminals 13b of the latter extend are aligned in substantially the same direction, but it also becomes possible to form a developed shape of the terminals 13b of the magnetic pole position sensor 13 in substantially a straight shape. Accordingly, a yield ratio of the terminals 13b of the magnetic pole position sensor 13 is enhanced and hence the cost can be reduced.

As is shown in FIG. 6, the power module 17 has a battery terminal 17a at the same potential as a power input and output terminal 24 (see FIG. 4) through which power is inputted from and outputted to an outside battery, an AC terminal 17b at the same potential as an output line of the stator windings 3a, a GND terminal 17c at the same potential as the rear bracket 2, and signal line terminals 17d controlling the internal semiconductor switching elements 16 and the like. The signal line terminals 17d are directly connected to the control board 22 by soldering, pressure welding, or welding.

In this embodiment, the signal line terminals 17d including the terminals 13b of the magnetic pole position detection sensor 13 and connected to the control board 22 are arranged substantially in line. Owing to this configuration, for example, when the terminals are soldered one by one, it becomes possible to connect the terminals including the terminals 13b of the magnetic pole position detection sensor 13 to the control board 22 efficiently without wasteful motion on the part of a soldering device or an operator. Hence, because a processing time can be shorter, the cost can be reduced.

Also, as is shown in FIG. 4, the resin case 20 includes a battery terminal 20a at the same potential as the power input and output terminal 24, an AC terminal 20b at the same potential as the output line of the stator windings 3b, and a GND terminal 20c at the same potential as the rear bracket 2, all of which are insert-molded with the resin case 20. The battery terminal 20a is installed on an inner peripheral side surface of the resin case 20 and connected to the battery terminals 17a of the power modules 17.

Also, the AC terminal 20b and the GND terminal 20c are insert-molded with the resin case 20 in an outer peripheral side surface. The AC terminal 20b is connected to the AC terminals 17b of the power modules 17 and the output line of the stator windings 3a. The GND terminal 20c is connected to the GND terminals 17c of the power modules 17. Also, the GND terminal 20c of the resin case 20 is connected to the heat sink 21 or the rear bracket 2. In this embodiment, the GND terminal 20c of the resin case 20 is tightened together with the heat sink 21 with screws and the bolts 23.

As is shown in FIG. 7, as with the power module 17, the field module 19 has a battery terminal 19a at the same potential as the power input and output terminal 24, a plus terminal 19b1 and a minus terminal 19b2 passing a current to the brushes 11, a GND terminal 19c at the same potential as the rear bracket 2, and signal line terminals 19d controlling the internal semiconductor switching elements 18 or the like. The signal line terminals 19d are directly connected to the control board 22 by soldering, pressure welding, or welding. The battery terminal 19a is connected to the battery terminal 20a installed on the inner peripheral side surface of the resin case 20. Also, the plus terminal 19b1 is connected to a case plus terminal 20b1 installed on the inner peripheral side surface of the resin case 20. The minus terminal 19b2 is connected to a case minus terminal 20b2 installed on the inner peripheral side surface of the resin case 20. Also, the GND terminal 19c is connected to the heat sink 21.

The battery terminal 17a of each power module 17 is connected to the battery terminal 20a of the resin case 20 and connected to the power input and output terminal 24. When the rotating electrical machine 100A performs a driving operation, a current inputted therein from the power input and output terminal 24 passes through the battery terminal 20a of the resin case 20 and is then distributed to the battery terminals 17a of the respective power modules 17. When the rotating electrical machine 100A performs a power generation operation, a current outputted from the stator windings 3a passes through the battery terminals 17a of the power modules 17 and is collected to the battery terminal 20a of the resin case 20, from which the current is outputted to the power input and output terminal 24. Hence, a large current flows through the battery terminal 20*a* of the resin case 20 and heat generated at the battery terminal 20*a* of the resin case 20 is increased. However, by installing the battery terminal 20*a* of the resin case 20 on the inner peripheral side surface, it becomes possible to effectively cool the vicinity of the battery terminal 20*a* of the resin case 20 by the hollow portion 14*a* of the inverter device 14, that is, by the cooling air W2 that passes through the second cooling air passage. Hence, the temperature of the battery terminal 20*a* of the resin case 20 can be lowered.

Further, by using a high heat-releasing material having heat conductivity of 20 W/(m·K) or higher as a resin material of the brush holder 12 and also by using a high heat-releasing material having heat conductivity of 100 W(m·K) or higher as a material of the brush plus terminal 12*b*1 and the brush minus terminal 12*b*2 of the brush holder 12 (see FIG. 4), it becomes possible to further effectively lower the temperature of the brush holder 12 by the cooling air W2 that flows in from the hollow portion 14*a* of the inverter device 14.

Second Embodiment

Figure 8:
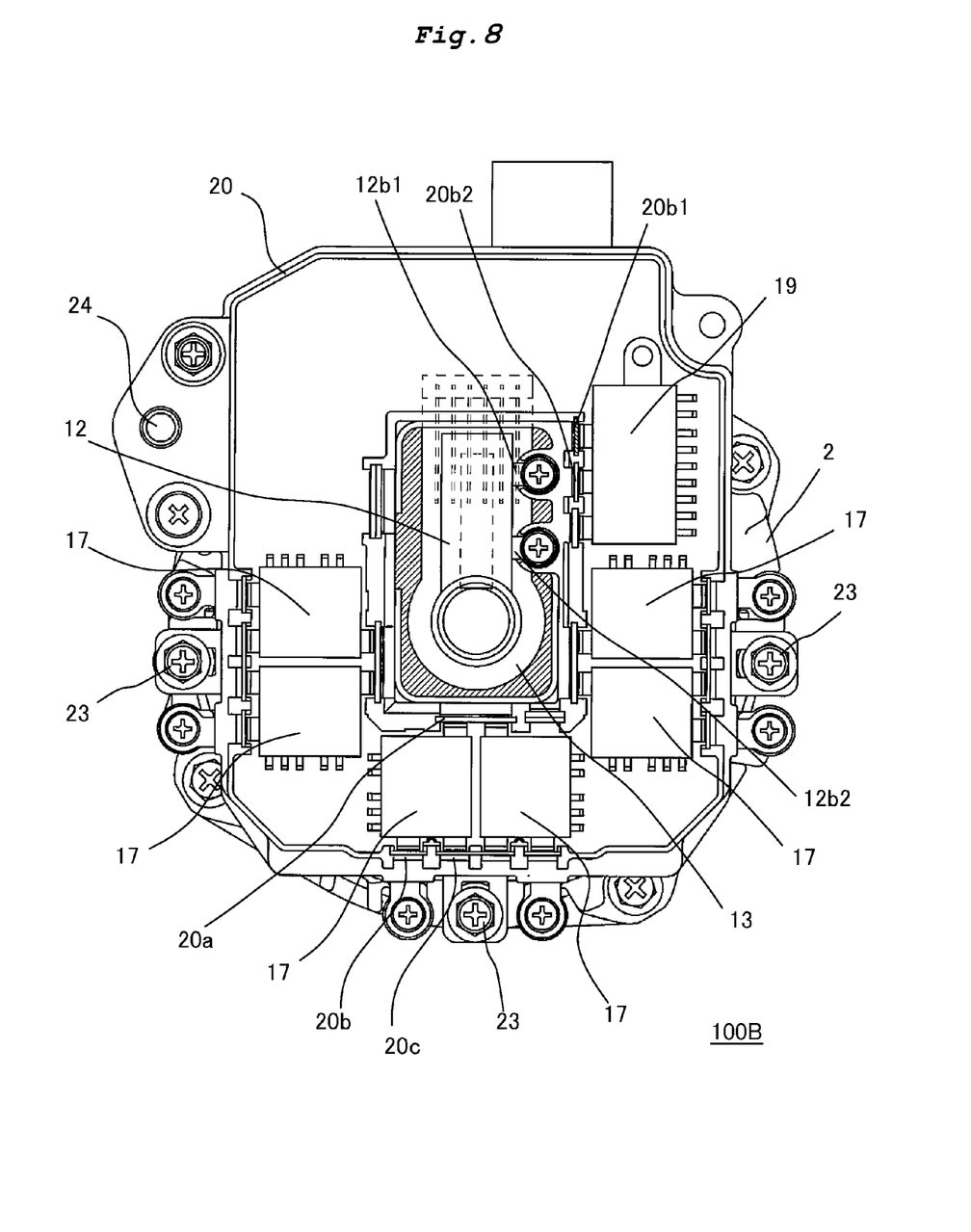
FIG. 8 is a view of a controller-integrated rotating electrical machine according to a second embodiment of the invention when viewed from a rear side by omitting an outside cover, waterproof resin, and a control board.

A controller-integrated rotating electrical machine according to a second embodiment of the invention will now be described. FIG. 8 is a view of the controller-integrated rotating electrical machine of the second embodiment when viewed from the rear side by omitting an outside cover, waterproof resin, and a control board.

In a rotating electrical machine 100B of the second embodiment, the brush plus terminal 12*b*1 and the brush minus terminal 12*b*2 of the brush holder 12 installed in the hollow portion 14*a* of the inverter device 14 are installed on one side of the brush holder 12. The rest of the configuration is the same as that of the first embodiment above, and a description is omitted herein by labeling the same portions with the same reference numerals.

According to the rotating electrical machine 100B of the second embodiment, the brush plus terminal 12*b*1 and the brush minus terminal 12*b*2 of the brush holder 12 are installed on one side of the brush holder 12. Hence, a brush plus terminal 12*b*1 installed on the inner peripheral side surface of the resin case 20 can be smaller without having to reduce a passage area for the cooling air W2 that flows in from the rear in the axial direction. Accordingly, the cost can be reduced in addition to the advantages of the rotating electrical machine 100A of the first embodiment above.

Third Embodiment

Figure 9A:
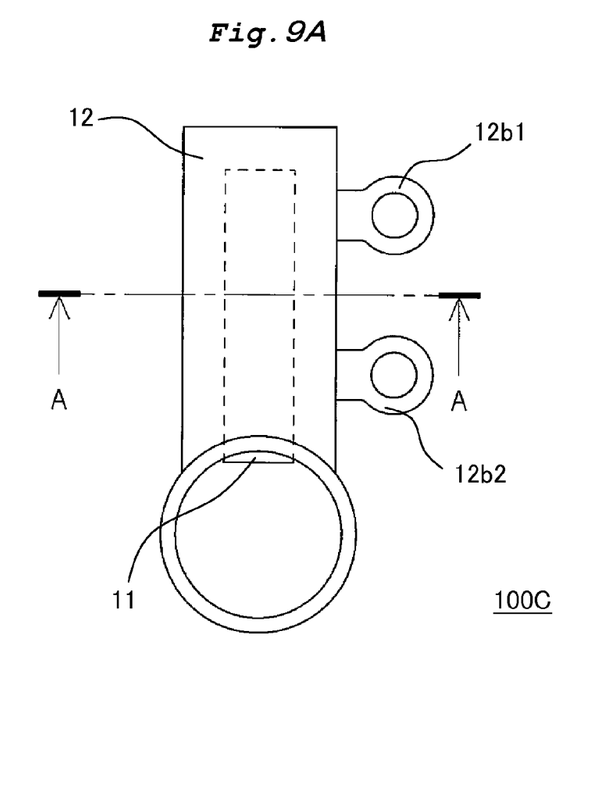
FIGS. 9A and 9B are views showing a brush holder installed in a hollow portion of an inverter device mounted on a controller-integrated rotating electrical machine according to a third embodiment of the invention.
Figure 9B:
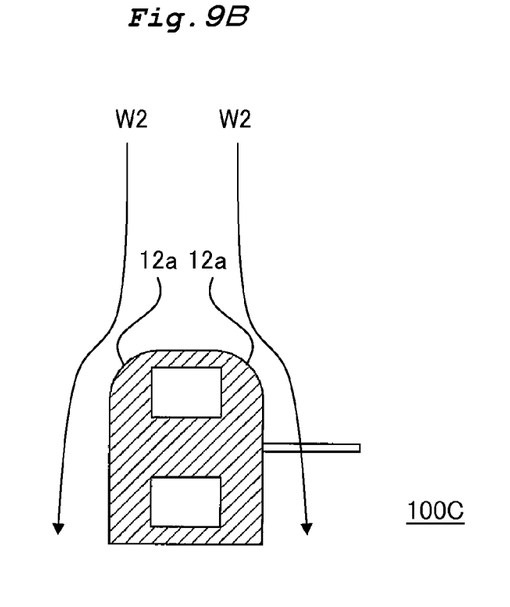

A controller-integrated rotating electrical machine according to a third embodiment of the invention will now be described. FIGS. 9A and 9B are views showing a brush holder installed in a hollow portion of an inverter device mounted on the controller-integrated rotating electrical machine of the third embodiment.

In a rotating electrical machine 100C of the third embodiment, a shape of the brush holder 12 is improved as are shown in FIGS. 9A and 9B. More specifically, a taper shape or a round shape 12*a* is provided to the brush holder 12 on an inlet side of the cooling air W2. FIG. 9A is a front view of the brush holder 12 and FIG. 9B is a cross section taken on the line A-A of FIG. 9A. The rest of the configuration is the same as that of the second embodiment above and a description is omitted herein by labeling the same components with same reference numerals.

As are shown in FIGS. 9A and 9B, by providing a taper shape or the round shape 12*a* to the brush holder 12 on the inlet side of the cooling air W2, it becomes possible to reduce a pressure loss by a current of the cooling air W2 that flows in from the hollow portion 14*a* of the inverter device 14. The inner peripheral side surface of the inverter device 14, the brush holder 12, and the magnetic pole position detection sensor 13 can be therefore cooled effectively. It thus becomes possible to lower the temperatures of the inverter device 14, the brush holder 12, and the magnetic pole position detection sensor 13.

Fourth Embodiment

Figure 10A:
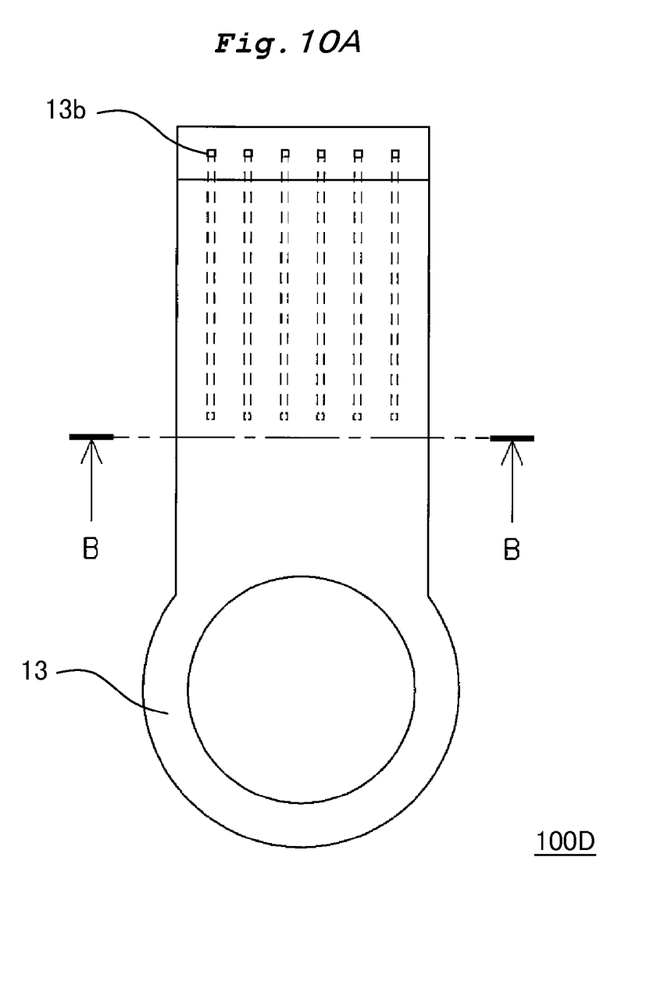
FIGS. 10A and 10B are views showing a magnetic pole position detection sensor installed in a hollow portion of an inverter device mounted on a controller-integrated rotating electrical machine according to a fourth embodiment of the invention.
Figure 10B:
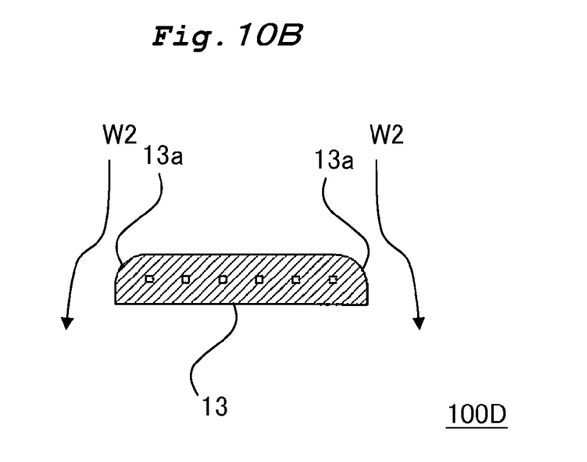

A controller-integrated rotating electrical machine according to a fourth embodiment of the invention will now be described. FIGS. 10A and 10B are views showing a magnetic pole position detection sensor installed in a hollow portion of an inverter device mounted on the controller-integrated rotating electrical machine of the fourth embodiment.

In a rotating electrical machine 100D of the fourth embodiment, a shape of the magnetic pole position detection sensor is improved as are shown in FIGS. 10A and 10B. More specifically, a taper shape or a round shape 13*a* is provided to the magnetic pole position detection sensor 13 on an inlet side of the cooling air W2. FIG. 10A is a front view of the magnetic pole position detection sensor 13. FIG. 10B is a cross section taken on the line B-B of FIG. 10A. The rest of the configuration is the same as that of the first embodiment above and a description is omitted herein by labeling the same portions with same reference numerals.

As are shown in FIGS. 10A and 10B, by providing a taper shape or the round shape 13*a* to the magnetic pole position detection sensor 13 on the inlet side of the cooling air W2, it becomes possible to reduce a pressure loss by a current of the cooling air W2 that flows in from the hollow portion 14*a* of the inverter device 14. The inner peripheral side surface of the inverter device 14, the brush holder 12, and the magnetic pole position detection sensor 13 can be therefore cooled effectively. It thus becomes possible to lower the temperatures of the inverter device 14, the brush holder 12, and the magnetic pole position detection sensor 13.

Fifth Embodiment

Figure 11:
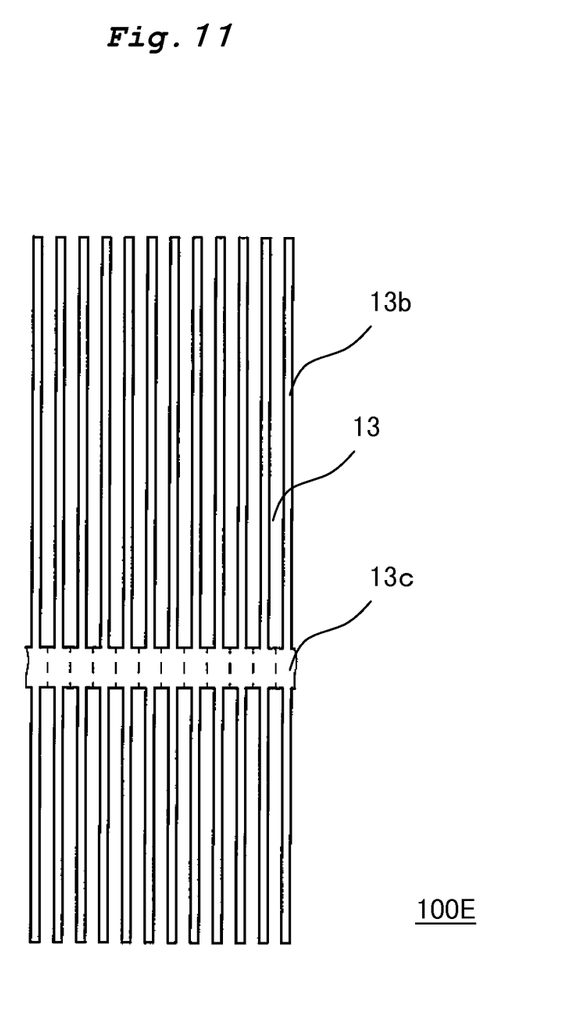
FIG. 11 is a view showing terminals of a magnetic pole position detection sensor mounted on a controller-integrated rotating electrical machine according to a fifth embodiment of the invention.

A controller-integrated rotating electrical machine according to a fifth embodiment of the invention will now be described. FIG. 11 is a view showing terminals of a magnetic pole position detection sensor mounted on the controller-integrated rotating electrical machine of the fifth embodiment.

In a rotating electrical machine 100E of the fifth embodiment, terminals of the magnetic pole position detection sensor are improved as is shown in FIG. 11. More specifically, terminals 13*b* of the magnetic pole position detection sensor 13 of substantially a straight shape are connected in a row in a reel shape with a connection portion 13*c* and divided from the connection portion 13*c* when used. The rest of the configuration is the same as that of the first embodiment above and a description is omitted by labeling the same portions with same reference numerals.

As is shown in FIG. 11, the terminals 13*b* of the magnetic pole position detection sensor 13 of substantially a straight shape are connected in a row in a reel shape by the connection portion 13*c* before they are divided. Hence, a yield ratio of the terminals 13b of the magnetic pole position detection sensor 13 is enhanced and hence the cost can be reduced.

While the first through fifth embodiments of the invention have been described, it should be understood, however, that the respective embodiments can be combined without any restriction and the respective embodiments can be modified or omitted as the need arises within the scope of the invention.

Various modifications and alterations of this invention will be apparent to those skilled in the art without departing from the scope and spirit of this invention, and it should be understood that this invention is not limited to the illustrative embodiments set forth herein.

What is claimed is:

1. A controller-integrated rotating electrical machine, comprising:
   a stator and a rotor supported on a front bracket and a rear bracket
   wherein:
   the rotor has a field winding generating a magneto-motive force and a cooling fan and is supported in a rotatable manner on a rotation shaft supported on a front bearing provided to the front bracket and a rear bearing provided to the rear bracket;
   a magnetic pole position detection sensor detecting a magnetic pole position of the rotating electrical machine and a brush holder having brushes that pass a current to the field winding are installed at a rear of the rear bearing in an axial direction of the rotation shaft;
   an inverter device controlling and passing a stator current to an armature winding of the rotating electrical machine is mounted on an outer side of the rear bracket at the rear in the axial direction of the rotation shaft;
   the inverter device includes switching elements passing the stator current, a heat sink cooling the switching elements, and a control board on which is mounted a control circuit that controls operations of the switching elements and the rotating electrical machine;
   the inverter device is provided with a hollow portion in a center portion of the rotation shaft of the rotating electrical machine;
   the rotating electrical machine has a first cooling air passage for cooling air generated by the cooling fan to flow in from an outer side in a radial direction of the rotating electrical machine, then to cool the heat sink, and to be discharged through ventilation holes provided to the rear bracket on an outer peripheral side by passing an inner periphery of the rear bracket, and a second cooling air passage for cooling air to flow into the hollow portion from the rear in the axial direction, then through the area immediately surrounding the brush holder and the magnetic pole position detection sensor so as to cool the brush holder and the magnetic pole position detection sensor, and to be discharged through the ventilation holes by passing the inner periphery of the rear bracket; and
   the brushes and the magnetic pole position detection sensor are installed in such a manner that a sliding direction of the brushes and a direction in which terminals of the magnetic pole position detection sensor extend are aligned in substantially a same direction.

2. The controller-integrated rotating electrical machine according to claim 1, wherein:
   a control element controlling a current flown to the field winding is installed in such a manner that a longitudinal direction thereof is at a position offset to be substantially parallel with respect to the sliding direction of the brush and the direction in which the terminals of the magnetic pole position detection sensor extend.

3. The controller-integrated rotating electrical machine according to claim 1, wherein:
   a developed shape of the terminals of the magnetic pole position detection sensor is substantially a straight shape.

4. The controller-integrated rotating electrical machine according to claim 1, wherein:
   terminals including the terminals of the magnetic pole position detection sensor and connected to the control board are arranged substantially in line.

5. The controller-integrated rotating electrical machine according to claim 1, wherein:
   a brush plus terminal and a brush minus terminal of the brush holder are installed to one side of the brush holder.

6. The controller-integrated rotating electrical machine according to claim 1, wherein:
   one of a taper shape and a round shape is provided to the brush holder on an inlet side of the cooling air.

7. The controller-integrated rotating electrical machine according to claim 1, wherein:
   one of a taper shape and a round shape is provided to corners of the magnetic pole position detection sensor on an inlet side of the cooling air.

8. The controller-integrated rotating electrical machine according to claim 1, wherein:
   a high heat-releasing material having heat conductivity of 100 W/(m·K) or higher is used as a material of a brush plus terminal and a brush minus terminal of the brush holder.

9. The controller-integrated rotating electrical machine according to claim 1, wherein:
   a high heat-releasing material having heat conductivity of 20 W/(m·K) or higher is used as a resin material of the brush holder.

10. The controller-integrated rotating electrical machine according to claim 1, wherein:
    terminals of the magnetic pole position detection sensor are connected in a row in a reel shape by a connection portion in a manner dividable from the connection portion.

11. A controller-integrated rotating electrical machine, comprising:
    a stator and a rotor supported on a front bracket and a rear bracket
    wherein:
    the rotor has a field winding generating a magneto-motive force and a cooling fan and is supported in a rotatable manner on a rotation shaft supported on a front bearing provided to the front bracket and a rear bearing provided to the rear bracket;
    a magnetic pole position detection sensor detecting a magnetic pole position of the rotating electrical machine and a brush holder having brushes that pass a current to the field winding are installed at a rear of the rear bearing in an axial direction of the rotation shaft;
    an inverter device controlling and passing a stator current to an armature winding of the rotating electrical machine is mounted on an outer side of the rear bracket at the rear in the axial direction of the rotation shaft;
    the inverter device includes switching elements passing the stator current, a heat sink cooling the switching elements, and a control board on which is mounted a control circuit that controls operations of the switching elements and the rotating electrical machine;

the inverter device is provided with a hollow portion in a center portion of the rotation shaft of the rotating electrical machine;

the rotating electrical machine has a first cooling air passage for cooling air generated by the cooling fan to flow in from an outer side in a radial direction of the rotating electrical machine, then to cool the heat sink, and to be discharged through ventilation holes provided to the rear bracket on an outer peripheral side by passing an inner periphery of the rear bracket, and a second cooling air passage for cooling air to flow into the hollow portion from the rear in the axial direction, then to cool the brush holder and the magnetic pole position detection sensor, and to be discharged through the ventilation holes by passing the inner periphery of the rear bracket;

the brushes and the magnetic pole position detection sensor are installed in such a manner that a sliding direction of the brushes and a direction in which terminals of the magnetic pole position detection sensor extend are aligned in substantially a same direction; and a control element controlling a current flown to the field winding is installed in such a manner that a longitudinal direction thereof is at a position offset to be substantially parallel with respect to the sliding direction of the brush and the direction in which the terminals of the magnetic pole position detection sensor extend.

12. A controller-integrated rotating electrical machine, comprising:

a stator and a rotor supported on a front bracket and a rear bracket wherein:

the rotor has a field winding generating a magneto-motive force and a cooling fan and is supported in a rotatable manner on a rotation shaft supported on a front bearing provided to the front bracket and a rear bearing provided to the rear bracket;

a magnetic pole position detection sensor detecting a magnetic pole position of the rotating electrical machine and a brush holder having brushes that pass a current to the field winding are installed at a rear of the rear bearing in an axial direction of the rotation shaft;

an inverter device controlling and passing a stator current to an armature winding of the rotating electrical machine is mounted on an outer side of the rear bracket at the rear in the axial direction of the rotation shaft;

the inverter device includes switching elements passing the stator current, a heat sink cooling the switching elements, and a control board on which is mounted a control circuit that controls operations of the switching elements and the rotating electrical machine;

the inverter device is provided with a hollow portion in a center portion of the rotation shaft of the rotating electrical machine;

the rotating electrical machine has a first cooling air passage for cooling air generated by the cooling fan to flow in from an outer side in a radial direction of the rotating electrical machine, then to cool the heat sink, and to be discharged through ventilation holes provided to the rear bracket on an outer peripheral side by passing an inner periphery of the rear bracket, and a second cooling air passage for cooling air to flow into the hollow portion from the rear in the axial direction, then to cool the brush holder and the magnetic pole position detection sensor, and to be discharged through the ventilation holes by passing the inner periphery of the rear bracket;

the brushes and the magnetic pole position detection sensor are installed in such a manner that a sliding direction of the brushes and a direction in which terminals of the magnetic pole position detection sensor extend are aligned in substantially a same direction; and one of a taper shape and a round shape is provided to corners of the magnetic pole position detection sensor on an inlet side of the cooling air.

* * * * *